United States Patent
Pialot

(10) Patent No.: US 7,399,374 B2
(45) Date of Patent: Jul. 15, 2008

(54) SYSTEM FOR PRODUCING A REINFORCING STRUCTURE FOR A TIRE WITH VOLUMETRIC CONTROL

(75) Inventor: Frédéric Pialot, Moissat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 248 days.

(21) Appl. No.: 11/000,930

(22) Filed: Dec. 2, 2004

(65) Prior Publication Data

US 2005/0076993 A1 Apr. 14, 2005
US 2008/0000574 A9 Jan. 3, 2008

Related U.S. Application Data

(63) Continuation of application No. PCT/EP03/05625, filed on May 28, 2003.

(30) Foreign Application Priority Data

Jun. 3, 2002 (FR) .................................. 02 06822

(51) Int. Cl.
*B29D 30/16* (2006.01)
(52) U.S. Cl. ...................................... 156/117; 156/133
(58) Field of Classification Search .................. 156/117, 156/397, 133
See application file for complete search history.

(56) References Cited

U.S. PATENT DOCUMENTS

| | | | |
|---|---|---|---|
| 1,728,957 A | 9/1929 | Dickinson | |
| 3,761,341 A | 9/1973 | Kimble | |
| 3,770,042 A | 11/1973 | Greene et al. | |
| 4,804,436 A | 2/1989 | Debroch et al. | |
| 4,963,207 A * | 10/1990 | Laurent | 156/117 |
| 5,156,781 A * | 10/1992 | Bohm et al. | 264/40.1 |
| 5,221,406 A | 6/1993 | Laurent | |
| 5,655,891 A | 8/1997 | Deal et al. | |
| 6,461,459 B1 | 10/2002 | Ogawa et al. | |
| 6,616,783 B2 * | 9/2003 | Senbokuya et al. | 156/117 |
| 2002/0046796 A1 | 4/2002 | Hitotsuyanagi et al. | |
| 2003/0051794 A1 | 3/2003 | Suda et al. | |

FOREIGN PATENT DOCUMENTS

| | | |
|---|---|---|
| EP | 0 557 615 | 9/1993 |
| EP | 0 791 485 | 8/1997 |
| EP | 0 943 421 | 9/1999 |
| EP | 0 956 940 | 11/1999 |
| EP | 1 075 928 | 2/2001 |
| FR | 2 669 582 | 5/1992 |
| GB | 987 983 | 3/1965 |
| JP | 2001-088225 A * | 4/2001 |

* cited by examiner

*Primary Examiner*—Geoffrey L Knable
(74) *Attorney, Agent, or Firm*—Buchanan Ingersoll & Rooney PC

(57) ABSTRACT

A tire reinforcement structure having parallel threads is made by providing a substantially toroidal rotatable form and a reinforcement-constructing an apparatus disposed adjacent the form. At a forming section of the apparatus a group of multiple parallel threads is formed. The group of threads is fed to a joining section where the threads are embedded in an elastomeric composition to form a strip which is fed to a cutting section where the strip is successively cut into portions. The strip portions are successively fed to a depositing section which successively deposits the portions of the strip along a predetermined trajectory onto the surface of the rotating form. The strip portions are formed in situ at the form and are deposited directly onto the form from the depositing section.

10 Claims, 6 Drawing Sheets

SYSTEM FOR PRODUCING A REINFORCING STRUCTURE FOR A TIRE WITH VOLUMETRIC CONTROL

This application is a continuation of International Application PCT/EP03/05625 filed on May 28, 2003 and published in the French language under WO 03/101714 on Dec. 11, 2003.

FIELD OF THE INVENTION

The present invention concerns the manufacture of tires. More precisely, it relates to the laying of threads in order to constitute a reinforcement structure for a tire. More particularly, it proposes means able to fabricate such a reinforcement structure on a form close to or identical to the shape of the internal cavity of the tire, that is to say a substantially toroidal form, supporting the blank of a tire during its manufacture.

BACKGROUND OF THE INVENTION

In this technical field, methods and apparatuses are already known which make it possible to integrate the fabrication of tire reinforcement structures in the assembly of the tire itself. This means that, rather than using semi finished products, such as reinforcement plies, one or more reinforcement structures are produced in situ, at the time of manufacture of the tire, and using a single coil of thread.

Amongst these methods and apparatuses, the solution described in the patent U.S. Pat. No. 4,804,436 proposes to produce reinforcement structures from a single thread. This solution in particular allows the production of a reinforcement structure under the tread.

It is also well known how to produce a reinforcement structure for a tire from a strip comprising reinforcement threads parallel to each other and embedded in an elastomeric composition such as a rubber composition. Such a strip is cut into portions and the portions are deposited adjacent to each other on a fabrication support, where the architecture so requires, in order to produce the tire reinforcement structure desired by the tire designer. Amongst the various variants of a method of fabrication from strips, the patent U.S. Pat. No. 1,728,957 can be cited, which describes fabricating strips and then cutting portions and arranging strips on a substantially toroidal fabrication form, ensuring that a pitch which is as constant as possible is kept between the adjacent threads in the portion.

The technique of fabricating reinforcement structures from a strip has however not found many industrial applications since on the one hand it does not have the productivity of fabrication from plies and on the other hand it does not have the flexibility and precision of a technique of fabrication from an individual thread. When it is wished to fabricate a tire according to a technique affording little or absolutely no conformation of the uncured product during its manufacture, it is of prime importance to be able to deposit the reinforcement structures and the uncured rubber products constituting the future tire with very great precision with regard to both their positioning and the quantity of material deposited on the fabrication form.

SUMMARY OF THE INVENTION

The objective of the present invention is to propose a method and equipment which allow the fabrication of a reinforcement structure for a tire by depositing on a fabrication form, and this with very great precision in laying, a high level of efficiency, and by using means which are as simple as possible, guarantees of very great industrial robustness. Advantageously, this fabrication form is close to the shape of the internal cavity of the future tire.

The invention proposes a method of manufacturing a tire comprising a reinforcement structure comprising threads disposed substantially parallel to each other, the method using a substantially toroidal form on which the said reinforcement structure is progressively constructed, the method comprising the following steps:

forming a group of several threads disposed substantially parallel to each other, joining the threads by means of an elastomeric composition in order to form a strip, depositing the said strip along a predetermined trajectory on the surface of the said form, wherein, for a unit length of strip, a unit quantity of the said composition is used, determined according to the share taken by the said unit length of strip after its deposition on the form during the manufacture of the tire.

The invention also proposes an apparatus for the in situ fabrication of a strip for fabricating a reinforcement structure for a tire and depositing the strip on a form, with volumetric control. This apparatus for fabricating a reinforcement structure for a tire, the said reinforcement structure comprising threads disposed substantially parallel to each other, the said apparatus being intended to be used in cooperation with a substantially toroidal form on which the said reinforcement structure is progressively constructed by depositing arches of the said thread side by side along a desired trajectory for the said thread on the surface of the said form, comprises:

an assembler comprising an entry for receiving the threads, a rubber coating chamber, a volumetric pump for delivering an elastomeric composition inside the chamber, and an exit orifice for a strip comprising the threads joined by the said composition, a device for depositing the said strip comprising a reference framework with respect to which the said form can be installed at a known position, the depositing device comprising a head equipped with a guidance passage for the strip and a rolling-down member intended to cooperate with the said form, the apparatus comprising at least one actuator for guiding the said head with respect to the reference framework.

In a particular embodiment, the apparatus enables the strip to be deposited on the said form, with turning over from one layer to the next.

It should be noted first of all that, in the context of the present document, the term "thread" must of course be understood in an entirely general sense, encompassing a single filament, a multifilament, an assembly such as for example a cable or a yarn, or a small number of cables or yarns grouped together, whatever the nature of the material, and that the thread is precoated with an elastomer such as rubber or not. The term "strip" is used for designating an assembly of several parallel threads, connected by a matrix of uncured rubber. The term "portion" is used to designate a piece of strip, created by cutting a certain length of strip. A portion of strip allows the deposition of several arches of thread. "Arch" means a limited length of thread, stretching from a singular point to another in the tire as a finished vulcanized product. "Trajectory" means the exact trajectory of an arch in the finished tire. A set of arches deposited over the entire periphery of the tire forms a reinforcement structure. An arch in the meaning defined here, can form part of a casing or of a crown reinforcement or any other type of reinforcement structure.

Fundamentally, the invention relates to the depositing of successive portions of thread strip, in a configuration that is as close as possible to the configuration of the final product. It is of little importance if the reinforcement structure is, in order to be complete, fabricated in several successive rotations of the form or not, nor whether the portions successively deposited are deposited adjacent or on the contrary with a certain amount of space between them. The depositing of portions of strip on the fabrication form is carried out according to the trajectory sought. In the case (particular and non-limiting) of a form whose external surface defines the internal surface of the tire, delimiting the internal cavity of the tire, the deposition trajectory of a portion of strip is merged with the trajectory of an arch of thread in the tire.

When positions, orientations or directions are defined with the words "radially, axially, circumferentially", or when radii are spoken of, the form on which the tire is fabricated, or the tire by itself, is taken as a reference. The reference geometric axis is the axis of rotation of the form.

According to a particular aspect of the method proposed by the invention, the unit quantity is obtained by means of a volumetric control, the share taken being estimated according to the volume occupied by the said unit length. An extruder of a volumetric nature is therefore preferably used. In a variant, it would be possible to control the weights and to aim at contributions by weight. A control unit provides the synchronized control of the unit quantity of composition used and of the deposition of the unit length of the strip on the form. Advantageously, the strip is formed by members disposed at a fixed position in space, and the strip is then brought to a laying head, at least one laying outlet of which is able to move with respect to the form. Thus the movable members are less heavy; it is therefore easier to move them. Naturally, preferably, the said unit quantity is controlled by taking account of the length of strip accumulated between the formation of the strip and the laying head.

According to another particular aspect of the method proposed by the invention, the progressive construction of the reinforcement structure then takes place whilst the said form is in continuous rotation, by moving the laying head in a plane comprising the axis of rotation of the form. In order to obtain all the relative movements required for the laying of the strip on the surface of the form, it is possible to move the laying outlet transversely and parallel with respect to the axis of the form and to make the form rotate about its axis, these movements being judiciously combined. It is possible to design an implementation of the control where the control of the unit quantity of composition is controlled by the relative movement between the laying outlet and the form, or vice-versa. The control of the unit quantity is advantageously controlled by the rotation of the form. A strip with a constant cross-section is preferably formed, wherein the said volume occupied by the unit length is determined according to the radius of deposition on the surface of the form and the angle of the arc occupied by the unit length on the surface of the form.

According to a particular and non-limiting characteristic of the method proposed by the invention, in order to join the threads by means of an elastomeric composition, the said threads are introduced in parallel into an assembler comprising a formation chamber inside which the said composition is delivered, the assembler comprising an outlet orifice for the strip.

BRIEF DESCRIPTION OF THE DRAWINGS

The remainder of the description gives a clear understanding of all the aspects of the invention, relying on the following figures, which show a particular and non-limiting example of an apparatus according to the invention.

DETAILED DESCRIPTION OF THE INVENTION

Figure 1:
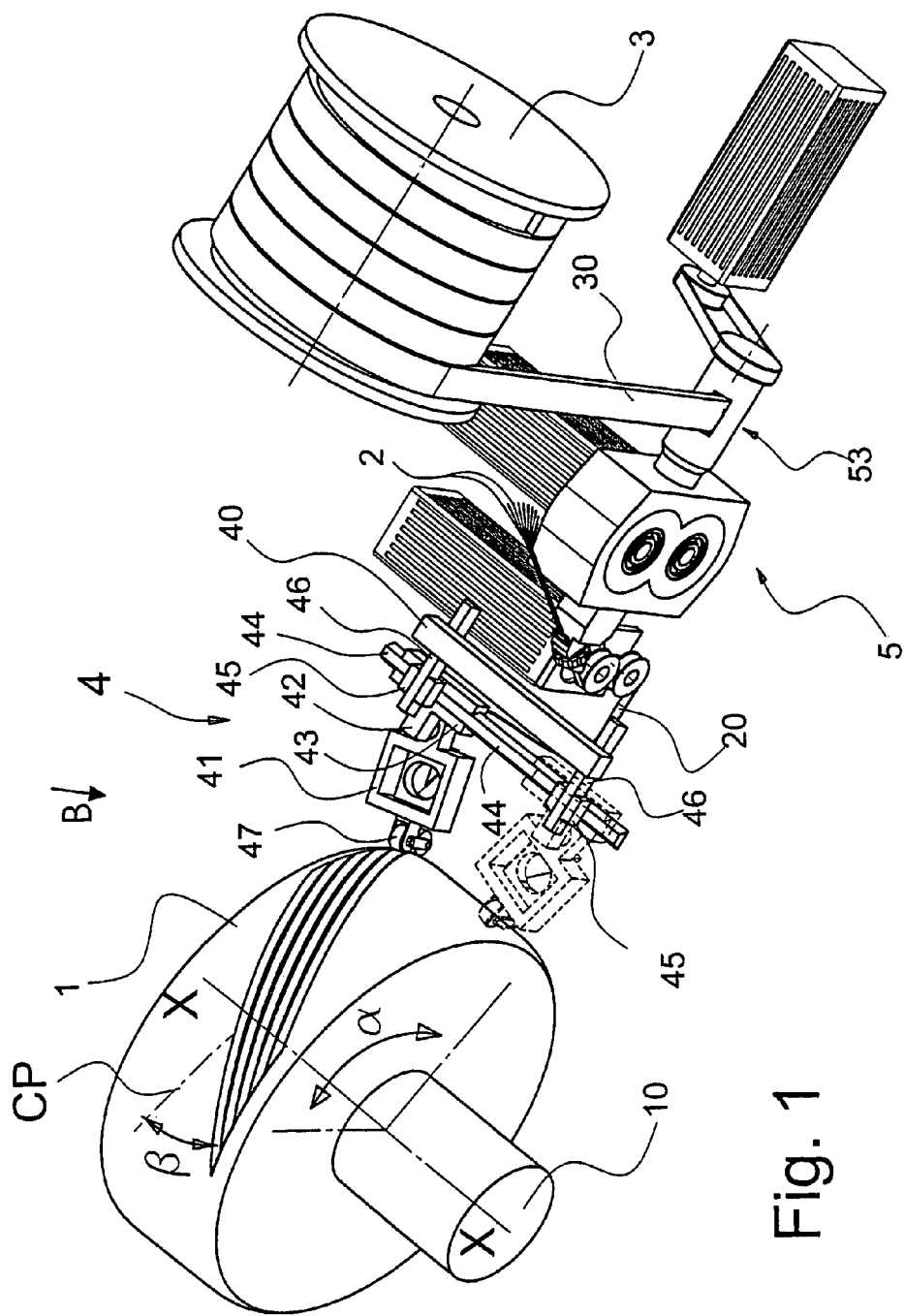
FIG. 1 depicts in perspective an apparatus according to the invention.
Figure 2:
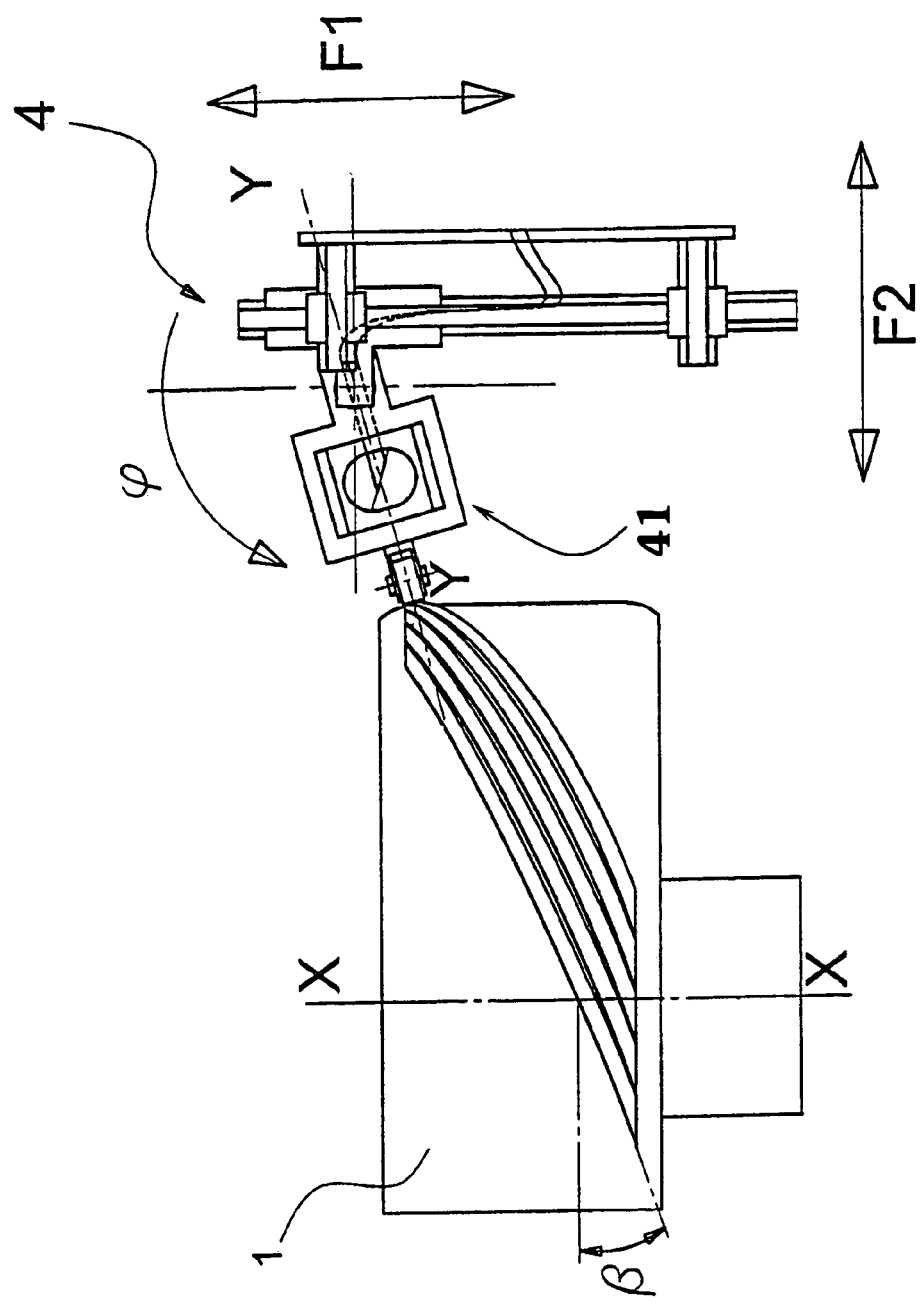
FIG. 2 is a view in the direction of the arrow B in FIG. 1.

In FIG. 1, a form 1 can be seen on which there are deposited, successively and in the order required by the architecture of the tire, all the elements making up the latter. This form 1, which is substantially rigid, can for example be a rigid metallic core in several pieces, a description of which can be found in patent application EP 1075928.

The reinforcement thread 2 used is stored upstream of the installation, for example on a set of reels, each mounted on a spindle forming part of a rack for storing as many reels of thread as there are threads in a strip. A pay-off device (not shown in order not to overload the drawing) for the threads 2 makes it possible to set in motion the threads 2 so as to bring them to the apparatus for fabricating a reinforcement structure for a tire. The pay-off device for the threads 2 preferably comprises as many motors as there are reels, each motor allowing to set in motion one thread 2. The pay-off device for the threads 2 makes it possible to set in motion the threads 2 with a well-controlled tension, for example as low as possible.

Figure 3:
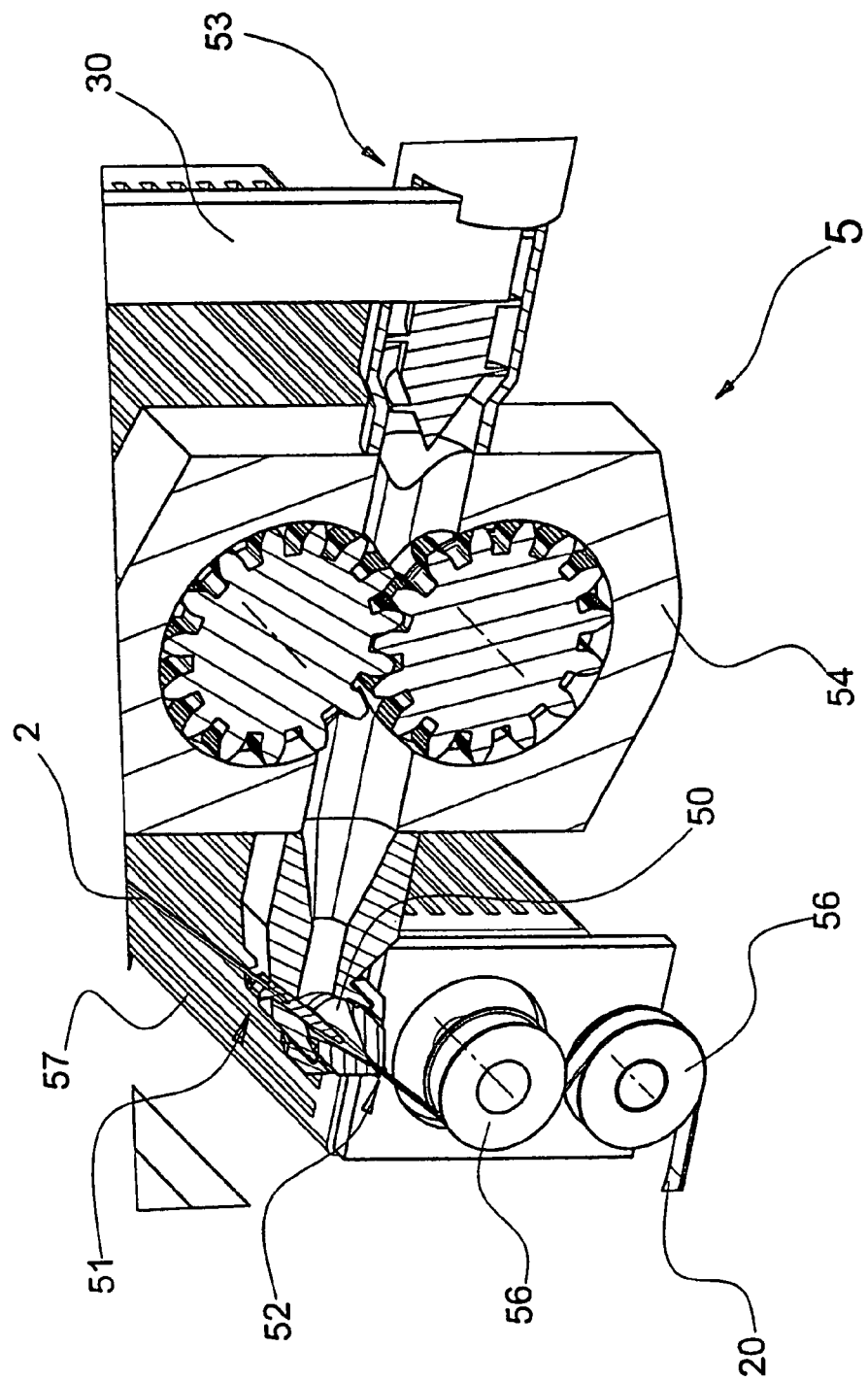
FIG. 3 is an enlargement showing in more detail the member referred to by reference 5 in FIG. 1.
Figure 4:
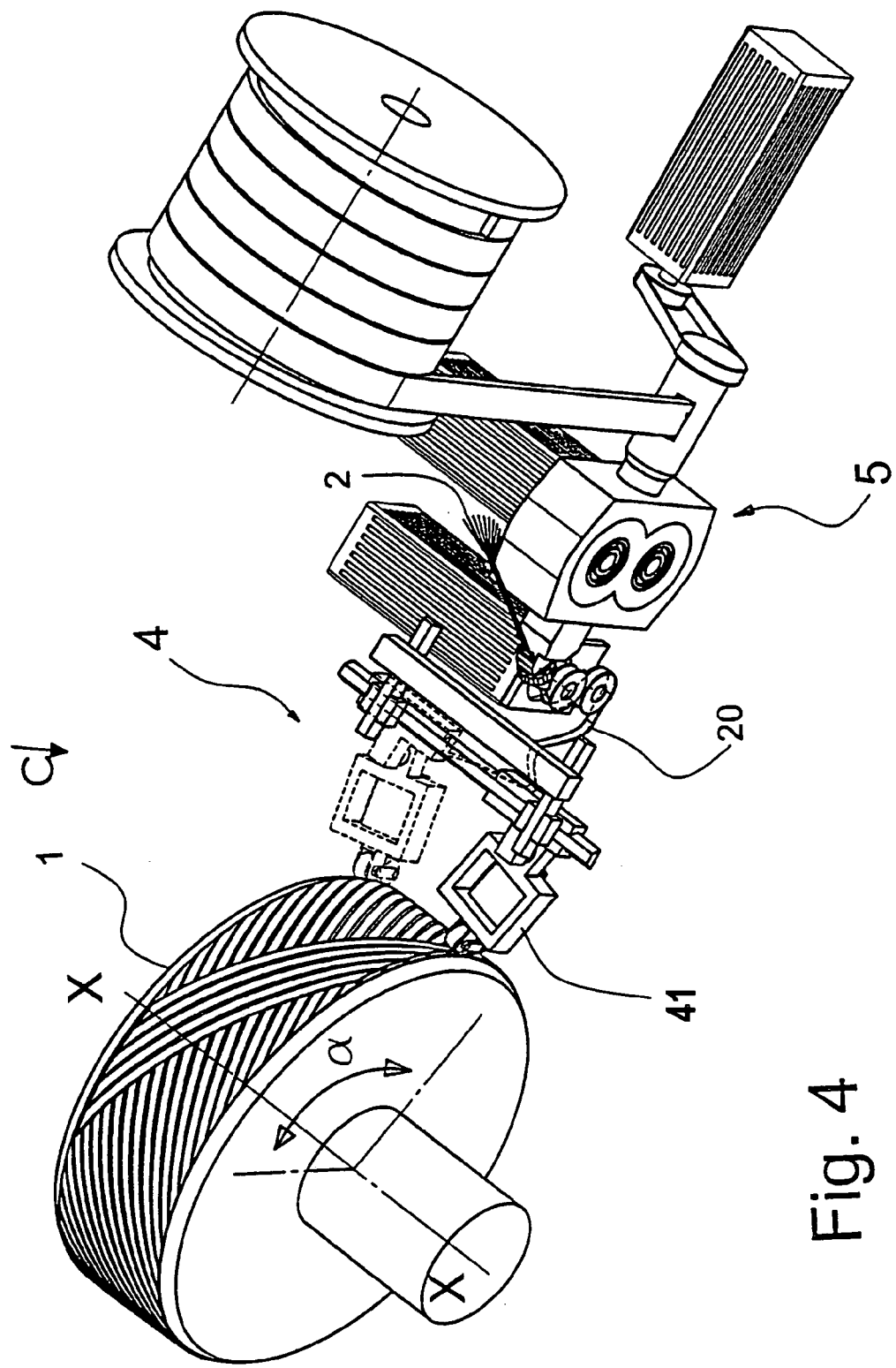
FIG. 4 is a view in perspective of the same apparatus as the one illustrated by FIG. 1 in another operating phase.
Figure 5:
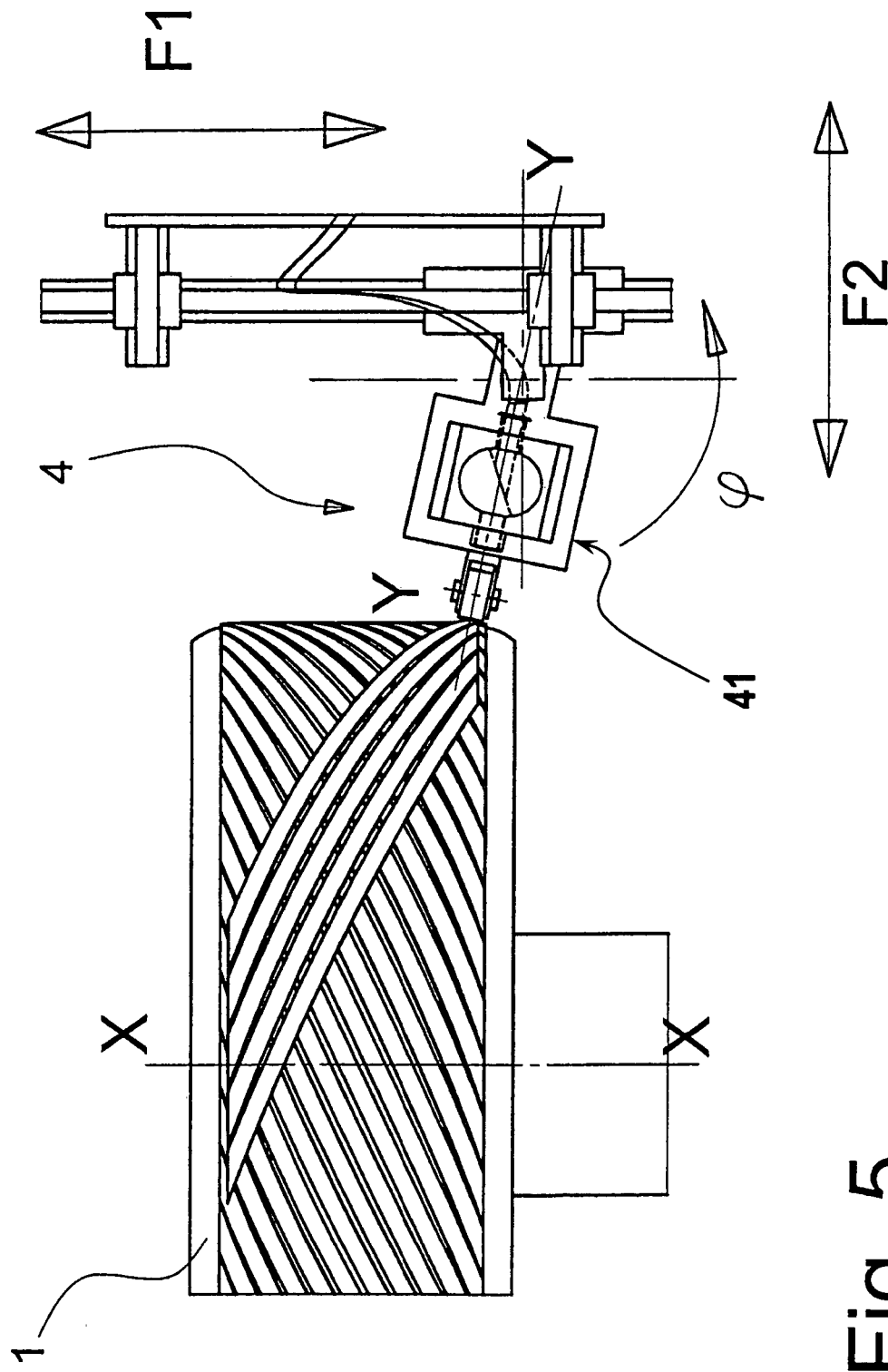
FIG. 5 is a view in the direction of the arrow C in FIG. 4.

The apparatus proper comprises essentially an assembler 5 and a laying head 4. The assembler 5 comprises a forming section having an entry orifice 51 (see FIG. 3) as far as which the threads 2 travel individually (FIGS. 1, 3 and 4 are schematic). The assembler 5 comprises a feed orifice 53 for introducing a ribbon 30 of an uncured rubber composition adapted to the use of the strip in the future tire. There can also be seen a reel 3 on which the said ribbon 30 is wound. The ribbon 30 is inserted in the feed orifice 53 of the assembler 5. The assembler S comprises a delivery device of a volumetric character, namely a voldmetric pump 54.

According to one characteristic of the present invention, the quantity of rubber composition for fabricating the strip is controlled positively according to the position of the strip on the form. In the embodiment described here, this is done using a mechanically volumetric pump. The volumetric pump 54 is for example a gear pump, as shown, or a piston pump. A description of a piston pump can be found in the patent U.S. Pat. No. 5,655,891.

The delivery device (also referred to as a "volumetric pump 54") allows the delivery of uncured rubber 30 into a joining section including a chamber 50 for forming a strip 20. The assembler 5 comprises an outlet orifice 52 for the strip 20. The assembler 5 comprises two rollers 56 around which the strip 20 is wound. At least one of the rollers 56 is set in rotation by a motor 57.

Figure 6:
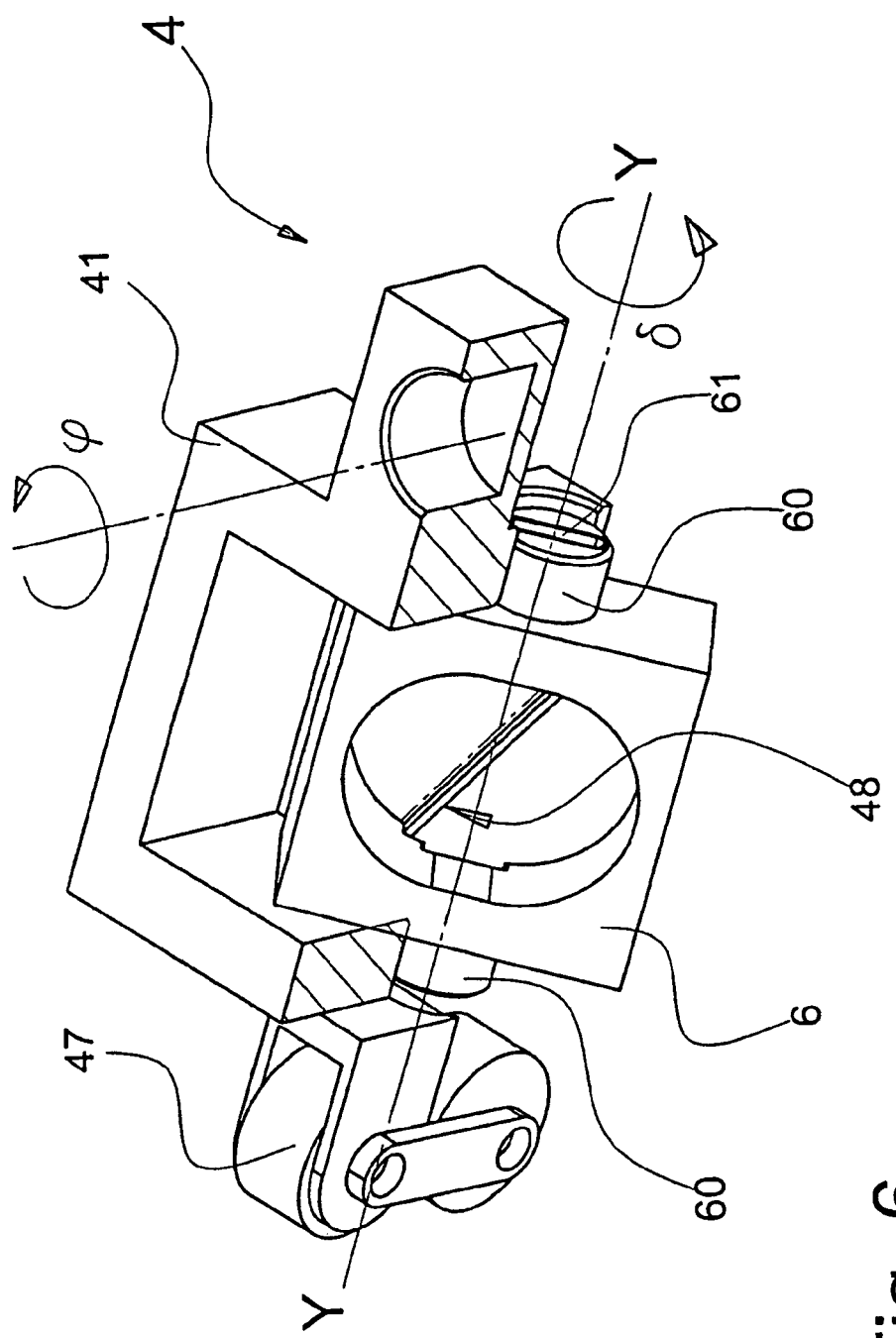
FIG. 6 is an enlargement showing in more detail the member referred to by reference 41 in FIG. 1.

The laying head 4, which forms a depositing section of the apparatus, is mounted opposite the form 1. It comprises a framework 40 on which a cradle 41 is mounted by means of the mechanism described below. The cradle 41 is mounted on a carriage 43 by means of a pivot 42. By virtue of the pivot 42, the cradle 41 can be oriented at an angle φ visible in FIG. 6. The laying head 4 also comprises a rolling-down device 49 comprising at least one roller 47 (two similar rollers for a better grip on the strip). The rolling-down device 49 can tilt about the axis YY by an angle δ. The rolling-down device 49 allows to apply the strip 20 with a certain pressure on the form 1. The carriage 43 is mounted on a guideway 44 substantially parallel to the axis of rotation XX of the form 1. The guideway 44 is itself mounted on two rails 46 parallel to each other, substantially perpendicular to the said guideway 44, by means of two slides 45.

In the cradle 41, a frame 6 is mounted on two bearings 60. Each of the bearings 60 comprises a slot 61 centered on the axis of the bearings 60. The strip 20 can travel through the slots 61, which provide a guidance passage for the strip 20. The frame 6 can rotate through at least 180° with respect to the cradle 41. The frame 6 thus mounted on the cradle 41 forms a turning-over mechanism and is a particular and non-limiting embodiment of a device for depositing the said strip comprising a mechanism for turning over the strip making it possible to invert the face of the strip which is brought in contact with the form by the laying head.

A cutting section includes a member 48 for cutting the strip, such as a guillotine (the blade of which can be seen in FIG. 6, the counter-blade being omitted), is integrated in the frame 6, and therefore in the laying head 4.

The form 1 is supported by a hub carrier 10, comprising a hub to which the form 1 is attached, and comprising the necessary motorization allowing to set in motion the form 1, with azimuth α controlled at all times. The framework 40 is mounted so as to be fixed with respect to the hub carrier 10, at least during the functioning of the installation (the aspects of approach and removal of the form 1 will not be dealt with here).

The cradle 41 can be presented in all required positions with respect to the form 1 (see FIGS. 1, 2, 4 and 5). That is to say it can be moved radially with respect to the form 1 (arrow $F_2$), can slide transversely with respect to the form 1 (arrow $F_1$), and can be inclined around the axis YY (angle δ) with respect to the form 1, and oriented at the angle φ. It is therefore possible to present the strip 20 to the form 1 in all positions required in order to ensure, in combination with the rotation of the form 1, its deposition according to any required deposition trajectory. Thus it is possible to deposit the strip 20 at any angle β with respect to the meridian plane CP in order to form a reinforcement structure at any angle β, even variable.

The functioning of the apparatus according to the invention will now be described.

According to a particular aspect of the invention, the apparatus comprises a unit for controlling the rotation movement of the form and the movement of the head with respect to the frame and the volumetric pump, the said unit being configured so that the quantity, per unit length of strip, of composition inserted inside the coating chamber by the volumetric pump is a function of the position occupied by the unit length of strip during its deposition on the form.

According to another particular aspect of the invention, the apparatus can comprise a unit controlling the rotation movement of the form and the movement of the head with respect to the framework and the volumetric pump, the said unit being configured so that the volume, per unit length of strip, of composition inserted inside the coating chamber by the volumetric pump is a function of the volume occupied by the said unit of length of the strip after its deposition on the form.

It can be seen in FIG. 1 that the laying head 41 is close to the right-hand shoulder of the future tire, whose shape can be clearly imagined by examining the rigid core 1 on which it will be constructed. The free end of the strip, previously cut forming an angle β, is presented to the surface of the form and is held there by the roller 47, at the required point in the shoulder area of the future tire. Naturally the material against which the strip 20 is applied must be such that the strip 20 has a tendency to remain bonded. Typically the form is already coated with uncured rubber, naturally sticking to the uncured rubber composition 30.

The elastomeric composition is delivered into the formation chamber 50 by means of the delivery device 54. The latter makes it possible to introduce the uncured rubber at a certain pressure inside the formation chamber 50, so that the rubber fills it completely. Whilst all the threads 2 pass through the formation chamber 50, a controlled volume of rubber is introduced into the formation chamber 50. The basic parameter for the control provided by the control unit is the rotation of the form 1. Moreover, the means of moving the laying head 4 with respect to the form 1, whose functioning is described below, are themselves controlled so as to produce a certain deposition trajectory according to the architecture of the tire to be manufactured. The radius at which the strip is deposited is therefore in particular known at all times, which makes it possible, given the constitution of the strip, which is also determined by the architecture of the tire, to calculate the volume deposited on the form. The volume occupied by the reinforcement threads in themselves is also known.

It is from the rotation of the form 1, and considering its known geometry and the movements of the laying head 41, and considering the stock in hand (the stock of strip existing between the formation chamber 50 and the point where the strip joins the form 1), that the control unit therefore determines the volume of rubber to be introduced into the formation chamber 50. At the same time, the threads 2 set in motion this same volume of rubber out of the formation chamber 50. Thus the strip 20 appearing at the extrusion orifice 52 comprises all the threads 2 unwound in parallel and a well-controlled quantity of impregnation rubber 30. The strip 20 is itself motorized by means of rollers 56 and the motor 57 so that it is set in motion out of the chamber 50 with a substantially constant tension.

A compensation area can be seen, interposed between the assembler 5 and the laying device 4, in which a certain (known) length of strip is accumulated. This makes it possible to ensure without impact the essentially continuous functioning of the assembler 5 and the essentially discontinuous functioning of the laying head 41, and therefore allows to smoothen the formation of the strip with respect to the variations in speed of the form 1, with regard to which it was stated above that it was a basic parameter of the control provided by the control unit.

So as to be able to avoid the deleterious effects of drift in functioning, it is advantageous to measure the length of strip actually used, independently of the control parameters which continuously calculate the length of strip to be manufactured. A measuring roller, preferably independent of the roller or rollers 47 (not shown), is equipped with a coder which makes it possible to know at any moment and with precision the length of strip deposited on the form 1. This makes it possible to adjust the manufacture of the strip to the quantity of strip actually deposited on the form 1.

The core 1 is set in rotation (angle α) and the cradle 41 is able to move with respect to the form. The cradle 41 is moved in translation from right to left (arrow $F_1$) in order to regain the position in which it is drawn in broken lines, all this synchronously. Whilst the cradle 41 moves over a width which corresponds to the width of the reinforcement structure fabricated under the tire tread, the core 1 is driven in rotation so as to travel over an arc α. During these movements, the strip 20 is applied against the form 1 by the rolling-down roller 47. Towards the end of these movements, the guillotine integrated in the laying head cuts the strip whilst complying with the angle which it is wished to give to the edge of the strip. This angle corresponds to the angle which must be formed by the edge of the following portion. There is therefore no waste of material between two successive portions.

To allow automatic functioning, the strip is continuously in engagement in the laying head 4. An automatic advance device (not shown) for the strip after cutting makes it possible for its free end to be once again in engagement with the rolling-down device 49 after cutting, so as to be able to be once again presented to the form 1 and pressed against it. The control unit continuously knows the length of the accumulated and non-positioned strip, which makes it possible to take account of this stock in hand in the volumetric control of the unitary quantity of composition per unit length of strip.

Step by step, the required number of portions of strip are deposited on the form, for example adjacent to each other, progressively covering the entire periphery of the fabrication form. Through the formation of the strip as described here, the pitch between all the threads is constant in the strip. In the end, it is possible to arrange so as to keep the same pitch or a different pitch between the adjacent threads issuing from two different strips.

The operation of depositing the portions of strip 20 may give rise to as many complete turns of the form 1 as there are portions of strip in order to produce a complete reinforcement structure or, as soon as the laying head joins the left-hand shoulder of the future tire, it may be returned to the opposite shoulder without interrupting the rotation of the form 1 and another portion of strip can be deposited as soon as the laying head rejoins the right-hand shoulder. It suffices to arrange to leave a space between the two positioned portions corresponding to an integer number of portions which will be installed during successive rotations.

In order to pass from one layer to the following layer (or in other words to pass from one ply to the following ply), according to a particular but advantageous characteristic of the present invention, a turning-over device is integrated in the laying head. It suffices to make the frame 6 pivot through 180° and the strip 20 is ready to effect the deposition of the following layer. The movements disclosed above are then repeated, except that the action is from left to right instead of working from right to left. This is what is depicted in FIG. 4.

In a particular application, the invention makes it possible to fabricate a reinforcement structure comprising many arches of threads obtained by successively depositing adjacent portions of strip created by cutting the strip. In a more particular case still, the said reinforcement structure forms part of a belt situated underneath the tread. In another more particular case, the said reinforcement structure forms part of a carcass going at least as far as a bead.

The invention allows depositing the reinforcement threads in groups forming a strip with a laying precision much better than what was proposed by the state of the art up to the present time for techniques of fabricating from strips. Moreover, by virtue of the strip turning-over device proposed by the present invention, the passage from one layer to another with change of angle formed by the reinforcement threads can take place extremely quickly, without in any way slowing down the rate of manufacture of an apparatus according to the invention, and without waste of material.

The invention claimed is:

1. Method of manufacturing a tire reinforcement structure comprising threads disposed substantially parallel to each other, the method comprising the steps of:
  A. providing a substantially toroidal rotatable form and a reinforcement-constructing apparatus disposed adjacent the form,
  B. at a forming section of the apparatus forming a group of multiple threads disposed substantially parallel to each other,
  C. feeding the group of threads to a joining section of the apparatus where the threads are embedded in an elastomeric composition to form a strip;
  D. feeding the strip to a cutting section of the apparatus where the strip is successively cut into portions,
  E. successively feeding the strip portions to a depositing section of the apparatus which successively deposits the portions of the strip along a predetermined trajectory onto the surface of the form as the form rotates, to form a reinforcement ply comprising a plurality of the strip portions;
  F. wherein the strip portions are formed in situ at the form and are deposited directly onto the form from the depositing section, and
  G. varying, during steps C-F, the quantity of the composition applied to the threads per unit length of strip in step C as a function of the position on the form to be occupied by the respective unit length of strip.

2. Method according to claim 1, in which during step G the unit quantity used is obtained by means of a volumetric control for the composition, the share taken being estimated according to the volume occupied by the unit length.

3. Method according to claim 1, wherein the strip is formed by members of the apparatus disposed at a fixed position in space, and in which the strip is then brought to a laying head, at least one laying outlet of the laying head being able to move with respect to the form, and in which the unit quantity is controlled by taking account of the length of the strip accumulated between the formation of the strip and the laying head.

4. Method according to claim 3, wherein the progressive construction and depositing of the reinforcement structure takes place whilst the form is in rotation, by moving the laying head in a plane containing the axis of rotation of the form, the control of the unit quantity being controlled by the rotation of the form.

5. Method according to claim 1, wherein, in order to join the threads by means of an elastomeric composition, the threads are introduced in parallel into an assembler of the apparatus comprising a formation chamber inside which the composition is delivered, the assembler comprising an outlet orifice for the strip.

6. Method according to claim 1, wherein the reinforcement structure comprises many arches of threads obtained by successively depositing adjacent portions of strip created by cutting the strip.

7. Method according to claim 1, wherein the reinforcement structure forms part of a belt situated underneath the tread.

8. Method according to claim 1, wherein the reinforcement structure forms part of a carcass.

9. Method according to claim 1 wherein step E includes pressing the strip portions against the form by a roller element of a laying head of the apparatus, which laying head carries a cutter performing the cutting of step D.

10. Method of manufacturing a tire reinforcement structure comprising threads disposed substantially parallel to each other, the method comprising the steps of:
  A) providing a substantially toroidal form and a reinforcement constructing apparatus disposed adjacent the form, the form being rotatable about an axis, B) at a forming section of the apparatus, forming a group of multiple threads disposed substantially parallel to each other, C) feeding the group of threads to a joining section of the apparatus where the threads are embedded in an elastomeric composition to form a strip, D) feeding the strip to a laying head of the apparatus which includes a frame that guides the strip past a cutter disposed on the frame, E) activating the cutter to successively cut the strip into separate strip portions, and F) forming a reinforcement ply of strip portions by successively feeding the strip portions to a depositing section of the laying head which successively deposits the strip portions along a predetermined trajectory onto a circumferential surface of the form while rotating the form continuously in the same direction about the axis and while moving the laying head parallel to the axis, wherein each deposited strip portion extends in a single non-axial direction from a first cut end thereof adjacent a first axial side of the form to a second cut end thereof adjacent an opposite second axial side of the form, the strip portions being deposited such that the reinforcing ply comprises a plurality of the strip portions arranged in circumferentially adjacent relationship, G) regulating the quantity of the composition applied to the threads per unit length of strip in step C as a function of the position on the form to be occupied by the respective unit length of strip, and H) after the reinforcement ply has been formed on the form, inverting the frame about an axis coinciding with the longitudinal axis of the strip to invert the strip and the cutter, and thereafter repeating steps B-G to form a subsequent reinforcement ply.

* * * * *